Nov. 1, 1949  W. A. HOLTSHAUSER  2,486,786
TRIMMING DEVICE
Filed Oct. 12, 1945

INVENTOR
WILLIAM A. HOLTSHAUSER
By Rodney Bedell
ATTORNEY.

Patented Nov. 1, 1949

2,486,786

UNITED STATES PATENT OFFICE 2,486,786

TRIMMING DEVICE

William A. Holtshauser, Ferguson, Mo.

Application October 12, 1945, Serial No. 621,975

5 Claims. (Cl. 164—60)

The invention relates to devices for trimming sheet metal material and is applicable particularly for trimming roughly cut drilled sheets along lines a predetermined distance from the holes.

It is the practice in aircraft skin fabrication to clamp an oversized skin sheet in place on a drill jig or fuselage framework and thereafter drill all the rivet holes. After such holes are drilled there is varying amounts of excess metal beyond the rivet holes, and it is desirable to trim the sheet to a constant edge distance from such holes. The invention is particularly useful in trimming to final shape such roughly cut, drilled aircraft fuselage skin sections which heretofore have been cut to final shape by measuring and marking the desired distance from the holes, scribing a line along the marks, and trimming the sections on the scribed line by hand or with a bench shears. Trimming the sections in this manner was slow and there was considerable likelihood of error in cutting or marking the sections.

The object of the present invention, therefore, is to simplify trimming of predrilled sheet metal blanks by providing a trimming device which automatically trims the material to desired edge distance without first measuring or scribing the material.

Figure 1:
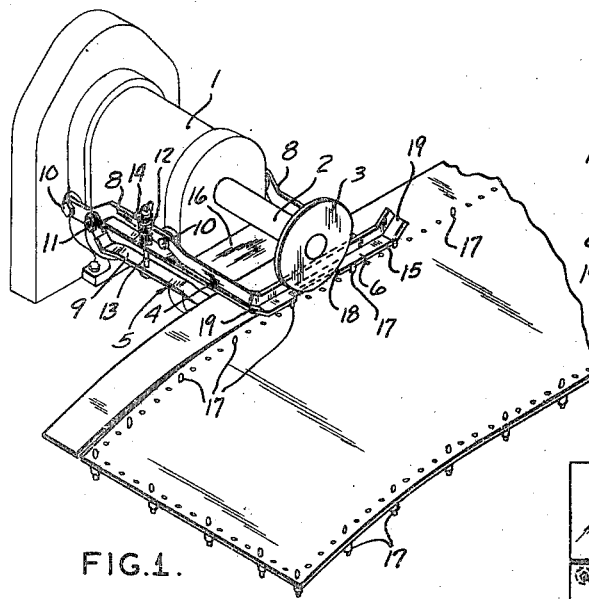
Figure 2:
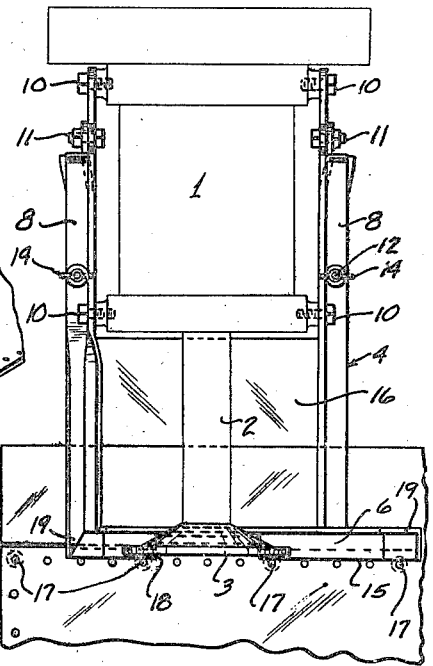
Figure 3:
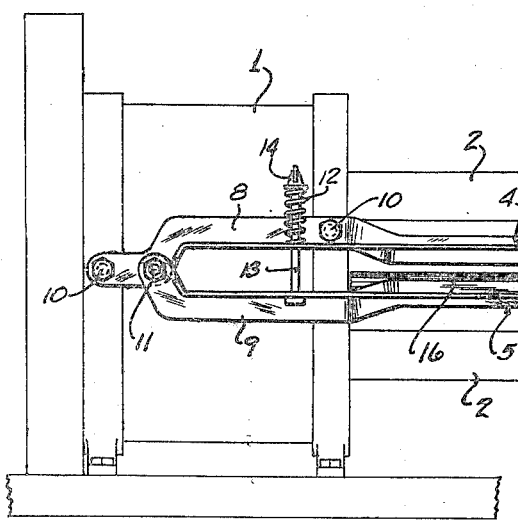
Figure 4:
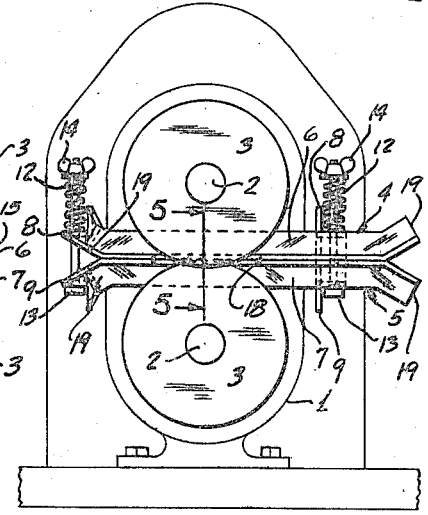
Figure 5:
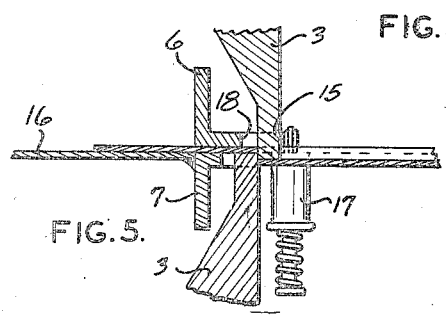

This and other detailed objects of the invention as will appear from the following description are attained in the structure illustrated in the accompanying drawing, in which:

Figure 1 is a perspective view of the sheet trimming device, constructed according to my invention, Figure 2 is a plan view thereof, Figure 3 is a side view of the device, Figure 4 is an end view thereof, and Figure 5 is a vertical section on lines 5—5 of Figure 4 showing the arrangement of the cutting rollers and jaws holding the material.

The trimming device constructed according to my invention and shown in the drawing comprises a body 1 supporting rotating shafts 2 provided at their ends with cutting rollers 3. The rollers and shafts are arranged to rotate uniformly in opposite directions at the same speed, and suitable means, not shown, is provided to drive the rollers in this manner.

A pair of jaws 4 and 5 hold the material while being cut and they comprise arms 8 and 9, extending outwardly from the two sides of body 1, and work engaging members 6 and 7 attached to arms 8 and 9 and positioned adjacent rollers 3. Arms 8 of jaw 4 are fastened rigidly to the sides of body 1 by screws 10, and arms 9 of jaw 5 are attached pivotally to arms 8 of jaw 4 by screws 11 so that the distance between jaws 4 and 5 can be varied to accommodate material of various thicknesses. Jaws 4 and 5 are urged together by compression springs 12 on bolts 13 fastened to arms 8 and 9. The tension of the jaws on the material can be increased or decreased by tightening or loosening nuts 14 on bolts 13 as may be necessary when materials of various thicknesses are used.

The work engaging members 6 and 7 preferably of angle irons hold the material in cutting position for rollers 3, and the horizontal flanges of the members are positioned transversely of the roller axes and extend before and behind the rollers in the direction of sheet movement. The members are cut away adjacent the rollers, as shown at 18, to accommodate the rollers, and they are bent away from each other at their ends 19 so that the material may be fed smoothly therebetween. Member 7 extends outwardly approximately to, but not beyond, a line on which the material is cut and engages only the waste portion of the material. The outer edge 15 of member 6 is positioned beyond member 7 and slightly beyond the outer edge of the rollers to guide the material during the cutting operation as described below, and the distance edge 15 extends beyond the cutting faces of the rollers determines the margin of the material to be left beyond the holes. To prevent the waste cut from the sheet from becoming entangled in the device, the waste material is supported by a flat plate 16 attached to member 7 and arms 9 of jaw 5 as shown in Figures 2 and 5.

The cutting device is used as follows: The material having been cut roughly to shape and rivet holes drilled therein, as explained above, pins or sheet holders 17, "such as Cleco fasteners," are inserted in holes several inches apart (perhaps in every third or fourth hole). The material is fed into the machine between jaws 4 and 5 with edge 15 of members 6 engaging the holders whereby rollers 3 cut the material along lines a predetermined distance from the holes.

A device of the kind described can be used to trim drilled sheet metal material to desired edge distance from the holes without scribing the material and without danger of inaccurate measurements. The device performs the trimming operation much faster than the old method. In actual practice in aircraft construction, it has been found that the old method of trimming a particular fuselage skin section required an average time of 29.4 man minutes per skin as compared to the average time of .5 man minute per skin when using a trimmer constructed according to applicant's invention.

Although the device as shown in the drawing is used to cut substantially straight edges, the device can be used to cut curved edges as well.

The details of the structure may be varied without departing from the spirit of the invention, and the exclusive use of those modifications of the described structure which come within the scope of the claims is contemplated.

What is claimed is:

1. A device of the class described adapted to trim a sheet of material along a line a predetermined distance from a series of predrilled holes in the material, said device comprising rotary cutters, a pair of jaws to hold said material in position in said cutters, said jaws being hinged relative to one another and being urged yieldingly together into engagement with said material, permitting said material to be moved between said jaws while being cut, the outer edge of one of said jaws being adapted to engage a series of pins inserted in the holes in said material and projecting above the surface thereof to guide said material between said cutters.

2. A device as described in claim 1 in which the jaw not engaging the pins extends outwardly approximately to, but not beyond, the line on which the material is cut.

3. A device as described in claim 1 in which the outer face of the jaw engaging the pins extends outwardly beyond the line on which the material is to be cut a distance equal to the edge distance from the holes.

4. A device of the class described adapted to trim a sheet of material along a line a predetermined distance from a series of predrilled holes, said device comprising rotary cutters, a pair of jaws to hold said sheet while being cut by said cutters and positioned in close proximity to said cutters and extending before and behind said cutters in the direction of sheet movement, one of said jaws extending outwardly beyond the inner edge of said cutters substantially to a line on which the sheet is cut, and the other jaw extending outwardly beyond said first mentioned jaw and beyond the outer edge of said cutters to guide said sheet, and said jaws being cut away adjacent said cutters to accommodate said cutters.

5. A device of the class described adapted to trim a sheet of material along a line a predetermined distance from a series of predrilled holes in the sheet, said device including cutting means comprising vertically disposed blades overlapping each other where they engage the sheet, a pair of sheet engaging members elongated in the direction of sheet movement and projecting transversely of the general plane of said blades with portions cut away to accommodate the blades, means urging said members yieldingly into engagement with the sheet, at least one of said members projecting beyond the blades sufficiently to engage a series of pins inserted in the predrilled holes in the sheet to guide the latter in its movement past the baldes.

WILLIAM A. HOLTSHAUSER.

REFERENCES CITED

The following references are of record in the file of this patent:

UNITED STATES PATENTS

| Number | Name | Date |
|---|---|---|
| 813,071 | Abbott | Feb. 20, 1906 |
| 1,014,567 | Chrestensen | Jan. 9, 1912 |
| 1,281,461 | Wills | Oct. 15, 1918 |
| 1,319,366 | Trogner | Oct. 21, 1919 |